Cole & Stone,
Sharpening Saws.

Nº 18,324. Patented Oct. 6, 1857.

UNITED STATES PATENT OFFICE.

JEREMIAH S. COLE AND HARLEY STONE, OF BLACKSTONE, MASSACHUSETTS.

SAW-FILING MACHINE.

Specification of Letters Patent No. 18,324, dated October 6, 1857.

*To all whom it may concern:*

Be it known that we, JEREMIAH S. COLE and HARLEY STONE, of Blackstone, in the county of Worcester and State of Massachusetts, have invented certain new and useful Improvements in Machines for Filing the Teeth of Saws, called "Saw-Filing Machines;" and we do hereby declare the following to be a full, clear, and exact description of the construction and operation of the same, reference being had to the accompanying drawings, in which—

Figure 1:
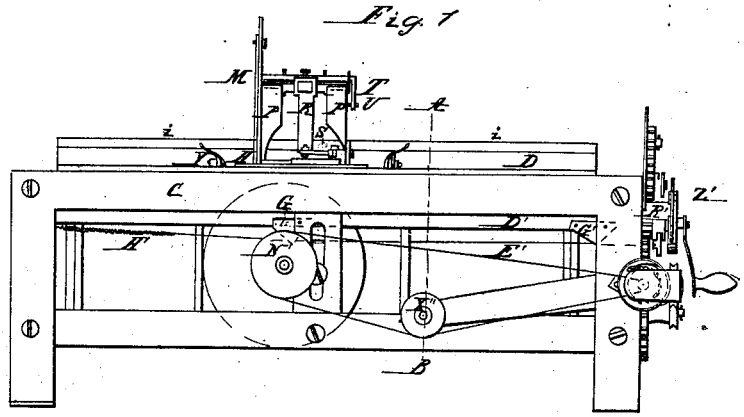
Figure 2:
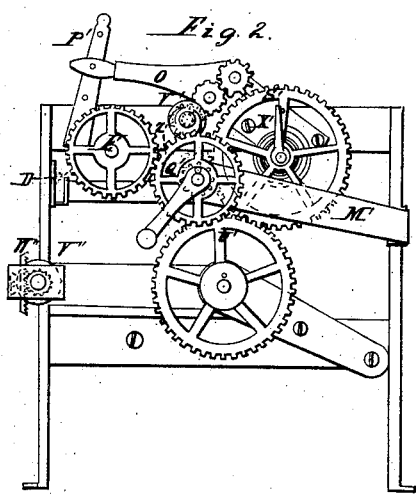
Figure 3:
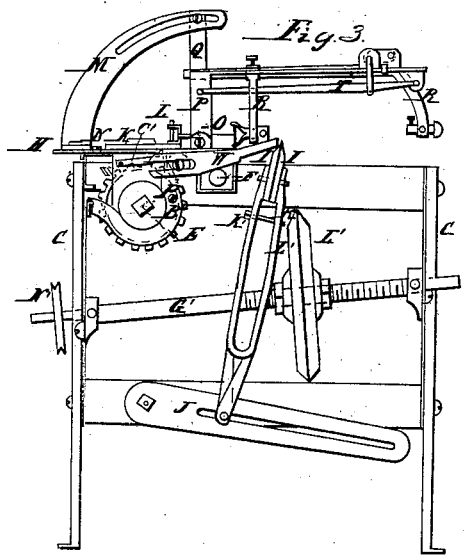
Figure 4:
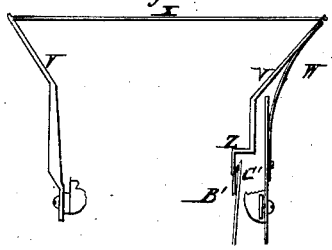
Figure 5:
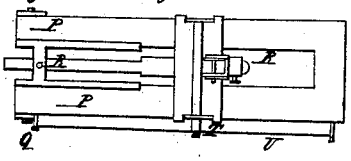

Figure 1 shows a front view or elevation; Fig. 2, an end view showing the gearing and its accompaniments. Fig. 3 shows a section through the line A, B, showing the carriage and clamp. Figs. 4 and 5 show some parts hereinafter to be described, the same letters indicating the same parts in each where they occur.

To construct our machine, make the frame C, C, (see drawings), to support the slide D and shafts E, F and G with suitable bearings, the slide D supporting and guiding the carriage by the plate H, to which is attached a nut fitting on the screw shaft F, the plate H also supporting the bevel gears I and J, I being fitted to slide on the shaft E and receive motion from it, the shaft being made square or with a groove and spline for that purpose, the gear J having a hub passing through H and K and receiving a slide in which is the crank-pin L, the slide allowing the crank-pin to be set for a small or large sweep according to the length of the pile used or stroke given to it. The plate K rests on H and turns on the hub of the gear and is secured in the desired position by the screw N which passes through a curved slot in K securing it to H. To H is attached the curved slotted arm M, and also ears or supports O O which support the slide frame P from which an arm Q extends up to M and holds the frame P in position wanted by a screw through the slot of M, the curve of said slot agreeing with the sweep of the arm Q. The slide frame P forms a slide in its upper part for the file frame or holder R which is made with adjustable sockets at each end with set screws to secure the file and govern its position, the file frame R receiving its motion from the crank-pin L by the connecting rod S which connects to both by universal joints to allow the slide to be changed from the plane of the crank, the rod S connecting to the inner end of R which slides on P while the outer end of R is hung to a lever from a slide moving on P, as seen in Fig. 5, said lever having an arm T extending down by the side of P and to which is fastened a friction strap or chain U passing over friction pins or pulleys in P, the lever and its arm being so arranged that when the crank moves the file frame forward the friction of the strap holding back on T holds or presses down the outer end of R and on the return of R or its moving back it holds up the same end to raise the file from its work, the amount of said raising being made sufficient to allow a tooth of the saw to pass under the file.

V, W, are two adjustable arms, their ends supporting a gage wire or card X and holding it near the saw and capable of being set or varied in height. One of the arms W is made with a spring A′ and lever Z, as seen in Fig. 4. A lever B′ is supported by H with its fulcrum at F′ and its upper end playing behind a spring catch C′, which catch is arranged to be cast off by the lever Z on the file touching the card X and depressing it. The other end of the lever B′ is notched to receive the edge of the plate D′, along which it slides as the carriage is moved.

D′ is a plate or slide extending the length of the machine with a projecting edge to operate the lever B′, D being hung on the levers G′, G′, which are arranged to transfer the perpendicular motion of to a horizontal one to the rod E′.

H′ is a spring holding up by its strain on E.

I′, I′, are the jaws or clamps to hold the saw by the screws K′ K′, the jaws being supported by the slotted levers J′ J′ which are hung at one end to be adjustable, the jaws being movable along the slot at pleasure and held in place by tightening the nuts at the joints, thus giving any position of inclination or height to the saw for filing.

L′ L′ is a pair of clamps for circular saws with screws on its shaft G to tighten them, the shaft being hung on swivel bearings at each end, which are arranged on slides to be raised or lowered to give any angle or position to the clamps L′.

On the front end of G is put a feed pulley N′ held by a set screw in place.

The construction of the driving gear shown in Fig. 2 is such that motion may be given to either of the shafts F or G in connection with the shaft E. To do this the power is applied to the sleeve on which the clutch Q' slides, as by the crank shown (for which a pulley may be substituted), the clutch having a spline playing in a slot in the sleeve, the wheels R' and Z' running loose on the sleeve with catches on their faces adjacent to the clutch between them for it to catch and drive them, the wheel Z' gearing into another on the shaft E and R' gearing into S'. On the shaft F is a ratchet with gear V' carrying a spring catch capable of being turned to drive the ratchet either way, the gear V' gearing into one of two on the lever O' which is hung on a pivot so that by raising or lowering the lever one or the other will be thrown into gear with S' and when set midway neither of them touch it.

P' is an arm with holes or catches to catch a pin or stud on O' and hold it as desired in either of the positions aforesaid.

The gear S' is loose on its stud and is provided with a spring behind it to return it to position indicated by the adjustable arm T' and has a stud to hit against said arm. Said stud when the wheel is turned around passes behind the lever M' and presses it out, throwing the clutch on the sleeve to the other gear or from Z' to R', the lever M' being hung at C²' and clasping the clutch controlling its position and extending forward connects to the rod E'. The gear U' receives motion from S' and has a pulley attached to it from which a band passes to a similar one on the bevel pinion V'', which drives the wheel W'', which by a ratchet and catch drives a pulley connected by a belt to N'.

X'' is a tightening pulley on an arm, its weight tightening the belt between the pulleys W'' and N', thus allowing N' to be moved with its shaft up or down without altering its driving belt.

The operation is as follows: A straight saw is placed in the clamps i, i, and secured by its screws and the clamps adjusted to bring the saw into position under the file in R and the frame P adjusted to give the file the proper angle and inclination according to the tooth wanted, the file being secured in the sockets of R to fit the side of the tooth it is to shape, the gage X' being set by its supporting arms V W to stand near the saw and so as to be touched by the file (when the tooth is sufficiently filed) to cast off the catch C'. The carriage being at the extreme left the lever O' is placed down to give proper motion to the screw shaft D, the catch of whose driving gear is placed to correspond.

Motion being given to the clutch and crank in the direction indicated by the arrow, the clutch being thrown into play with Z' drives the shaft E, which operates the file until it cuts the tooth sufficiently to touch the gage X, when casting off the catch C' from the lever B' the spring H' shifts the clutch from Z' to R' and the shaft E stops and the screw shaft F receiving motion is turned until the stud on the wheel S' passing behind the lever M' throws the clutch back into the former position, the amount of motion given the carriage by the screw depending on the position of the stud in S' at starting, said position being governed by the arm X', which should be set to give the carriage an amount of motion exactly equal to the teeth of the saw (and for a circular one the saw moves the same distance) being filed. The clutch being shifted replaces the lever B' to its catch and gives motion to the file as at first and the wheel S' and its companions are returned to place by its spring ready to act again. For circular saws the clamps i, i, are thrown over to the back of the machine and the saw placed in the clamps L' L' whose shaft is placed to bring the saw into the proper position under the file, the carriage being set over the shaft and the gage set as for the other clamps, the lever O is placed in its middle position, so as to throw its gear out of play with S', which now moves only U', V'', and W'', giving motion to the shaft G and saw, the other parts operating as before. In both cases these operations are continued until the saw is filed or finished without help from the attendant, making the machine automatic.

We do not claim broadly the use of a gage to prevent the file cutting too low or the use of a movable carriage, as machines have been made with these features, but were constructed upon different principles from ours and cannot accomplish the same results; but

What we claim as new and desire to secure by Letters Patent is,

The file holder constructed as described, in combination with the stop gage, and feeding mechanism, arranged and operating substantially in the manner and for the purposes above set forth.

In witness whereof we have hereunto set our hands in the presence of two witnesses.

JEREMIAH S. COLE.
HARLEY STONE.

Witnesses:
P. P. TODD,
A. C. ALLEN.